April 6, 1965          W. C. BRIGGS          3,176,501
ENTRAINMENT AND MIST SEPARATOR
Filed Dec. 8, 1961
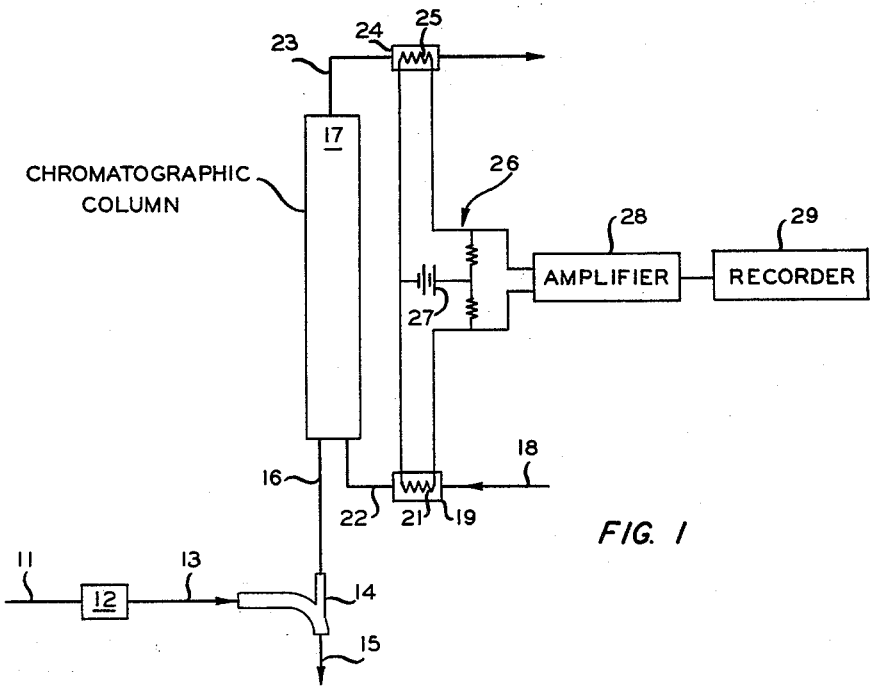
FIG. 1
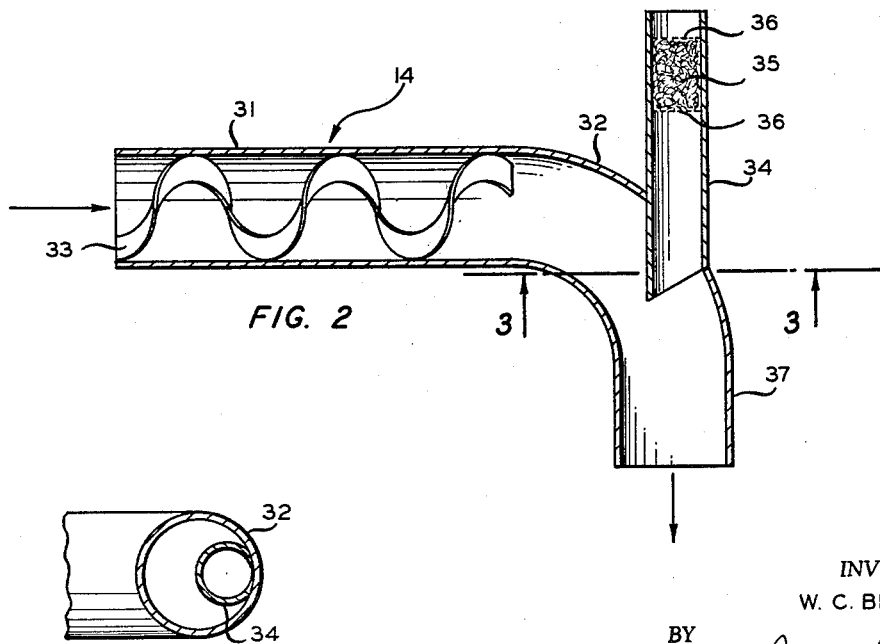
FIG. 2
FIG. 3
INVENTOR.
W. C. BRIGGS
BY Young & Quigg
ATTORNEYS 3,176,501
ENTRAINMENT AND MIST SEPARATOR
William C. Briggs, Sweeny, Tex., assignor to Phillips
Petroleum Company, a corporation of Delaware
Filed Dec. 8, 1961, Ser. No. 157,988
5 Claims. (Cl. 73—23.1)

The invention relates to an apparatus for the separation of entrained material and/or mist from a fluid. In one aspect the invention relates to an apparatus for separating entrained material and mist from fluid carrying the same through centrifugal action. In another aspect the invention relates to separation by centrifugal force, surface coalescing, and demisting. In another aspect the invention relates to a device for combination with continuous process analyzers to prevent the entry of liquid into the analyzer. In another aspect the invention relates to removal of entrained liquid from vaporized samples for analyzers.

It is a common procedure with many continuous process analyzers to vaporize a sample and to introduce the vaporized sample into the analyzer. Vaporized samples frequently contain a considerable quantity of entrained liquid. This entrained liquid can cause operational upset or damage to many continuous process analyzers. Moisture analyzers utilizing phosphorus pentoxide detection cells are particularly susceptible to certain oils and liquids. It is also desirable to remove the entrained material from vaporized samples for use in chromatographic columns. Removal of the entrained material from the vapor feed extends the life of the analyzer and results in improved operation of the analyzer.

It has been discovered that these difficulties can be eliminated through the utilization of a mist and entrainment separator. In accordance with the invention the mist and entrainment separator comprises means for subjecting the fluid to centrifugal force, means for coalescing the material, means for removing the coalesced material, and means for removing mist from the remaining fluid.

Accordingly it is an object of the invention to provide an apparatus for separating entrained material from a sample stream of a continuous process analyzer. Another object of the invention is to separate entrained material and mist from fluids containing the same.

Another object of the invention is to provide an entrained material and mist separator of simple construction and which occupies a relatively small amount of space.

Other aspects, objects, and the several advantages of the invention will be apparent from a study of the disclosure, the drawing, and the appended claims.

In the drawings FIGURE 1 is a schematic representation of a chromatographic analyzer system incorporating the invention;

FIGURE 2 is a vertical view, partly in cross section, of an entrainment and mist separator in accordance with the invention; and FIGURE 3 is a cross sectional view taken on line 3—3 in FIGURE 2.

Referring to the drawing and to FIGURE 1 in particular a sample to be subjected to chromatographic analysis is introduced through line 11 into vaporizing zone 12 wherein the sample is vaporized. The vaporized sample is passed through line 13 to entrainment separator 14. Liquid and solid materials entrained in the vapor are separated out and removed through line 15 to a closed liquid receiver, not shown. The sample which is substantially free of entrained material and mist is passed through line 16 to chromatographic column 17. A carrier gas is passed through line 18 into detection cell 19, which contains a suitable sensing element, such as thermistor 21. The carrier gas is then passed through line 22 to chromatographic column 17. The effluent from chromatographic column 17 is removed through line 23 and passed through detection cell 24 containing a suitable sensing element such as thermistor 25. Thermistors 21 and 25 are connected in adjacent arms of bridge network 26. A suitable source of potential 27 is connected between two opposing terminals of bridge 26, while the output voltage between the two remaining opposing terminals of bridge 26 is applied to the input terminals of amplifier 28. The amplified signal can be recorded by suitable recorder 29.

Referring now to FIGURE 2 entrainment and mist separator 14 comprises a straight section of tube 31 followed by curved section or elbow 32 having a short radius. In straight section 31 there is mounted a turning vane 33 in the form of a helix or screw. A section of tube 34 enters the short radius curved section 32. The portion of tube 34 extending into section 32 is preferably substantially vertical, and can be substantially parallel to the axis of the outlet end of curved section 32. A portion of tube 34 can be filled with Fiberglas or similar material which will serve as a demister pad 35. Retaining screens 36 are placed in tube 34 on each side of the demister pad 35.

The vaporized sample enters the turning vane in straight section 31. The velocity of the vaporized sample causes a spinning motion around the turning vane. Due to the heavier mass of the entrained parts, the spinning motion forces the entrained particles to the wall of tube section 31. Contact with the surface of the vanes or the inner wall surface of tube section 31 tends to coalesce the liquid particles, thereby removing them from the vapor. The coalescing effect is increased by the short radius of curved section 32.

Vapor removal tube 34 is mounted in curved section 32 in such a manner and is of such a size so as to prevent entrainment of the liquid. A baffle effect is created by the projection of tube 34 into curve section 32. The opening of vapor removal tube 34 is preferably downstream of the joint between curved section 32 and tube 34. As shown in FIGURE 3 tube 34 can be of such a size that a sufficient reduction of flow area occurs to effect an increase in velocity at the baffle and between 2 and 3 times the upstream velocity. This increased velocity prevents drops of liquid from forming on the baffle and being carried into tube 34 with the vapor. A demister pad 35 separates out any remaining entrained liquid or mist. Liquid withdrawal line 37 can be connected to any suitable vessel. The pressure in the entrainment and mist separator 14 is sufficient to provide for a liquid blowdown into the vessel. The vessel can be of any suitable size, but should preferably be maintained relatively small.

Entrainment and mist separator 14 can be relatively small and still handle large quantities of fluid without liquid carry-over. The liquid removal from the separator 14 can be manipulated responsive to a level controller or by manual operation without process interruption. Lag time of the sample for continuous analysis can be maintained at a minimum through advantageous utilization of the relatively small size of separator 14.

While the invention has been described in connection with continuous process analyzers, it is obvious that the invention can be utilized in any situation wherein it is desired to separate entrained liquid or solid particles and/or mist from a liquid. Thus the invention can be utilized to remove oil from compressed air lines, to remove solid and liquid particles from process analyzer sample lines, or to remove water from process lines and natural gas lines. Any suitable means of construction can be utilized, such as flange or screwed fittings. The material of construction can be determined by the anticipated use and size of the device.

Reasonable variation and modification are possible within the scope of the disclosure, the drawing and the appended claims.

I claim:

1. A chromatographic analysis system comprising a chromatographic column; a sample line; a first tube having, in the order named, an inlet, a straight section, and an elbow section having a short radius and a downwardly directed outlet; a helical vane mounted axially in said straight section; a vapor outlet tube communicating with and extending into said elbow section, the inlet opening of said vapor outlet tube being located downstream of the joint between said elbow section and said vapor outlet tube, said vapor outlet tube having a smaller cross-sectional area than said elbow section, the portion of said vapor outlet tube extending into said elbow section being substantially vertical; means for connecting said sample line to said inlet of said first tube; means for connecting the outlet of said vapor outlet tube to said chromatographic column; a first detection cell; means for passing carrier gas through said first detection cell and into said chromatographic column; a second detection cell, means for passing the effluent from said chromatographic column through said second detection cell; and means for comparing the outputs of said first and second detection cells.

2. Apparatus according to claim 1 further comprising a mist filter in said vapor outlet tube.

3. Apparatus for separating entrained material from a gas containing the same comprising a tube having, in the order named, an inlet, a straight section, and an elbow section having a short radius and a downwardly directed outlet; means for subjecting said gas to centrifugal force in said straight section to cause said entrained material to move toward the wall of said straight section; a subtantially vertical baffle mounted in said elbow section; means for for removing said gas in an upward direction from said elbow section at a point adjacent the downstream side of said baffle, and means for removing the thus separated entrained material through said outlet.

4. A chromatographic analysis system comprising a chromatographic column; a sample line; a first tube having, in the order named, an inlet, a straight section, and an elbow section having a short radius and a downwardly directed outlet having a substantially vertical axis; a helical vane mounted axially in said straight section; a vapor outlet tube communicating with and extending into said elbow section, the inlet opening of said vapor outlet tube being located downstream of the joint between said elbow section and said vapor outlet tube, said vapor outlet tube having a smaller cross sectional area than said elbow section, the portion of said vapor outlet tube extending into said elbow section being substantially parallel to the axis of said outlet; means for connecting said sample line to said inlet of said first tube; means for connecting the outlet of said vapor outlet tube to said chromatographic column; a first detection cell; means for passing carrier gas through said first detection cell and into said chromatographic column; a second detection cell; means for passing the effluent from said chromatographic column through said second detection cell; and means for comparing the outputs of said first and second detection cells.

5. Apparatus for separating entrained material from a gas containing the same comprising a tube having, in the order named, an inlet, a straight section, and an elbow section having a short radius and a downwardly directed outlet having a substantially vertical axis; a helical vane mounted axially in said straight section; a vapor outlet tube communicating with and extending into said elbow section, the inlet opening of said vapor outlet tube being located downstream of the joint between said elbow section and said vapor outlet tube, said vapor outlet tube having a smaller cross sectional area than said elbow section, the portion of said vapor outlet tube extending into said elbow section being substantially vertical; and a mist filter positioned in said vapor outlet tube intermediate the inlet and outlet of said vapor outlet tube.

References Cited by the Examiner

UNITED STATES PATENTS

| | | | |
|---|---|---|---|
| 1,708,653 | 4/29 | Boyrie | 55—456 X |
| 1,825,377 | 9/31 | Watts | 55—329 |
| 2,186,344 | 1/40 | Price | 55—396 |
| 3,038,326 | 6/62 | De Ford | 55—67 |

OTHER REFERENCES

Brealey, Elridge and Proctor: The Determination of Chloroform in Aqueous Pharmaceutical Preparations. In The Analyst 84 (997), pages 221–225, April 1959.

GEORGE D. MITCHELL, *Primary Examiner.*

HERBERT L. MARTIN, *Examiner.*